Oct. 19, 1965   C. L. WEIMER ETAL   3,213,183
BUS DUCT

Original Filed July 16, 1959   3 Sheets-Sheet 1

INVENTORS
Charles L. Weimer and
Samuel S. Fouse.
BY
William A. Elchik
ATTORNEY

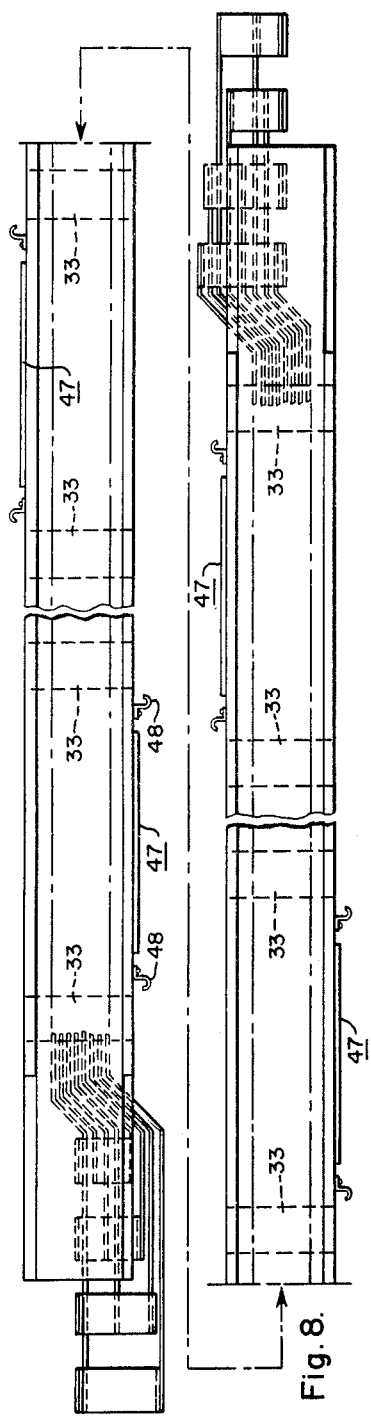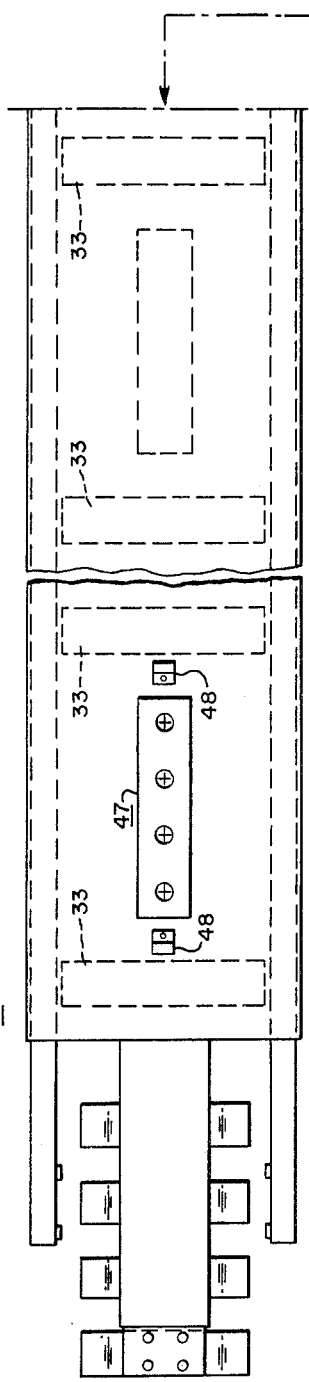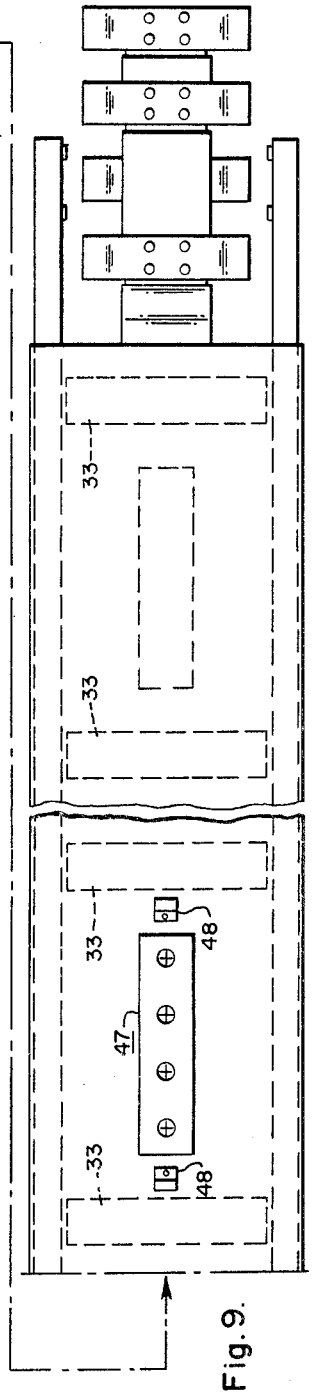
Fig. 8.
Fig. 9.

United States Patent Office 3,213,183
Patented Oct. 19, 1965

3,213,183
BUS DUCT
Charles L. Weimer, Patterson Heights, and Samuel S. Fouse, Hopewell Township, Beaver County, Pa., assignors to Westinghouse Electric Corporation, East Pittsburgh, Pa., a corporation of Pennsylvania
Original application July 16, 1959, Ser. No. 827,584. Divided and this application Oct. 8, 1962, Ser. No. 228,941
14 Claims. (Cl. 174—33)

This application is a division of our application Serial No. 827,584, filed July 16, 1959, now abandoned.

This invention relates, generally, to electric power distribution apparatus and, more particularly, to bus duct structures and plug-in or power take-off units for these structures.

It is known that the reactance of a multiphase power transmission system is reduced by spacing the phase conductors closely together. The close spacing neutralizes the magnetic fields and minimizes the skin and proximity effects normally caused when alternating current flows through the bus bars and, therefore, reduces the overall impedance to a minimum amount. If parallel-connected phase conductors are utilized, the inductive reactance of the system is reduced by so interlacing the phases that different phase conductors are adjacent.

In many aircraft, electronic, military and industrial operations, closely regulated voltages of high frequency power distribution are required. The present invention has particularly utility for these operations in that tests have shown that the voltage drop at 400 cycles of this new plug-in bus duct is lower than the voltage drop of conventional plug-in bus duct at 60 cycles.

It is a general object of the invention to provide bus duct structure which is simple and efficient in operation and which may be economically manufactured and installed.

A further object is to provide sections of bus duct with rigidly supported connections that provide convenient access to workmen.

Another object is to provide for connecting sections of bus duct by connecting together clamps which are connected to said bus duct.

Another object is to provide for connecting together bus duct sections by an interconnection of generally U-shaped clamps.

Another object is to provide multiphase bus duct with an interphase transposition along the length thereof.

Another object is to provide multiphase bus duct with closely spaced bus bars that have rigidly supported, conveniently accessible interphase transpositioning connections.

Another object is to provide interphase transpositions along the length of two sets of multiphase bus bars supported in a parallel spaced mutually flatwise relation.

Another object is to provide for tying together all like phases at interphase transpositioning connections of sections of bus duct where each section is composed of a plurality of sets of multiphase bus duct conductors.

These and other objects of this invention will become more apparent upon consideration of the following detailed description of preferred embodiments thereof, when taken in connection with the attached drawings, in which:

FIG. 8 is side elevational view in two halves of a section of bus duct;

FIG. 9 is a bottom plan view of the two halves of the section of bus duct shown in FIG. 8.

Figure 1:
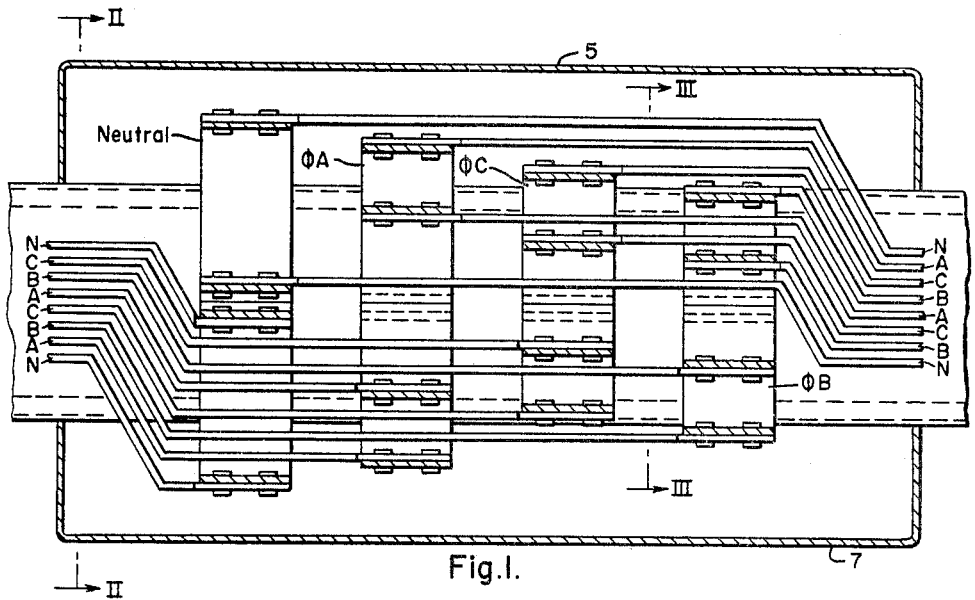
FIGURE 1 is a sectional view taken on line I—I of FIG. 2 showing the bus duct phase transpositioning connection.
Figure 2:
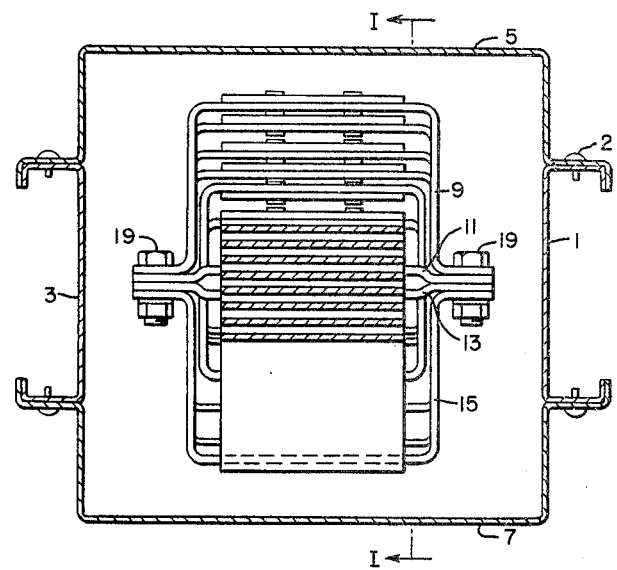
FIG. 2 is a sectional view taken on line II—II of FIG. 1.

Referring to the drawings, and particularly to FIGS. 1 and 2, sheet metal channel members 1 and 3 are side members of lengths of bus duct housing. These members are fastened by bolts 2 to sheet metal channel access covers 5 and 7 to form a suitable housing for the phase transpositioning connections illustrated in FIG. 1.

The bus duct housing and the housing for the phase transpositioning connections are made of a non-magnetic material, preferably aluminum. This eliminates magnetic circuits about the bus duct, thereby further reducing losses in the system.

Entering the connection housing at each end are two sets of four flat bus bar conductors arranged in a parallel spaced mutually flatwise relation. Each of these sets is composed of a neutral bus bar and three bus bars, each of which conducts a different phase of multiphase electric power distribution. The neutrals are disposed at the outside of each set.

The sets of bus bars enter the connection housing at the same level. In order that these sets may be vertically disposed in a mutually flatwise relation within the housing, the bus bars of the sets entering the housing at the left as shown in FIG. 1 are offset to planes lower than their original planes and the bus bars of the set entering the housing at the right are offset to planes higher than their original planes. As seen in FIG. 1, therefore, these sets overlap at their ends within the bus bar connection housing.

Figure 4:
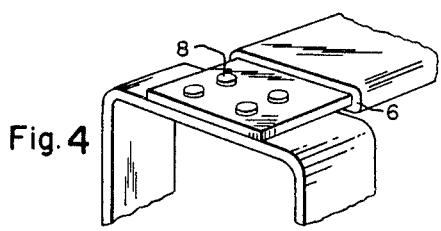
FIG. 4 is a perspective view of a typical bus bar and clamp connection, the end portion of the bus bar being uninsulated.

A U-shaped flange metal conductor clamp is riveted to the uninsulated end of each bus bar. The bus bars and conductor clamps are preferably silver plated to insure high conductivity and low heat rise. Except for the areas where electrical contact is made, the bus bars are insulated with a suitable plastic material or insulating tape 6. For purposes of clarity, this insulation is not shown in FIGS. 1, 2, 3 and 5. FIG. 4, however, is a perspective view showing the uninsulated end of a bus bar and clamp connected by rivets 8 or other suitable means. It is to be understood that all of the bus bars shown in FIGS. 1, 2, 3 and 5 are insulated, and that the end of each is uninsulated for connection as is shown in FIG. 4. The U-shaped clamps connected to the bus bars entering the connection housing from the left as seen in FIG. 1 have their open ends up and the U-shaped clamps connected to the bus bars entering from the right have their open ends down.

Figure 3:
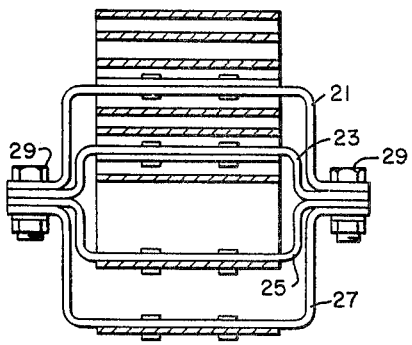
FIG. 3 is a sectional view taken on line III—III of FIG. 1.

The bus bars are relatively positioned so that, when the two sections are connected, the clamps at the ends of all like phases may be collected and bolted together at their flanges. In order that these clamps may be collected together, the U-shape of the outer clamps is deeper and broader than that of the inner clamps. As seen in FIG. 2, the U-shapes of clamps 9 and 15 are deeper and broader than those of clamps 11 and 13. As shown in FIG. 3, the U-shapes of clamps 21 and 27 are deeper and broader than those of clamps 23 and 25. FIG. 2 shows the four neutral clamps 9, 11, 13 and 15 bolted together by bolts 19 at their flanges, and FIG. 3 shows the four phase B clamps 21, 23, 25 and 27 bolted together at their flanges by bolts 29. In FIG. 1 it will be seen that all like phases are connected, that the clamps for like phases are on the same center lines transversely of the housing, and that the clamps of unlike phases are spaced longitudinally within the housing. This facilitates the making of tap connections at joints between sections.

The connections shown in FIG. 1 have effected an interphase transposition within each multiphase set of bus bars. The phase relationship of each set entering the connection housing from the left is $\phi C-\phi B-\phi A$, and the phase relationship of each set leaving the housing is $\phi A-\phi C-\phi B$. The neutrals are shown remaining on the outside so that the spacing from phase to neutral will be equalized by the rotation of phases.

Figure 6:
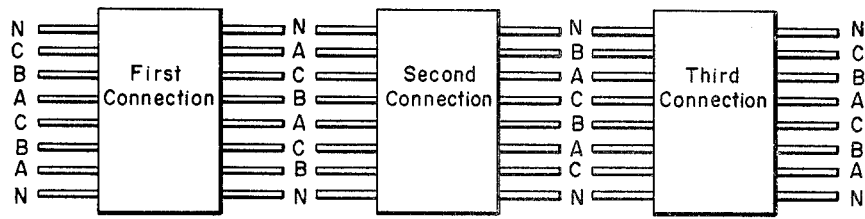
FIG. 6 is a schematic diagram showing three phase transpositioning connections similar to that of FIG. 1 with a return to the original phasing at the third connection.

FIG. 6 shows schematically three interphase transpositioning connections, similar to the connection shown in FIG. 1, with a return to the original phase relationship at the third connection.

Refering to FIGS. 1, 2 and 3, it will be seen that the U-shaped clamps provide very stable connections in that they are supported on both sides by their flanges. It should be noted that a workman can have easy access to these connections because the bolts 19 and 29 are disposed at the sides of the bus bars.

In addition to effecting a transposition of phases at the connections, all like phases are also collected and electrically connected. This effects a balancing of the load on each set of bus bars.

Figure 5:
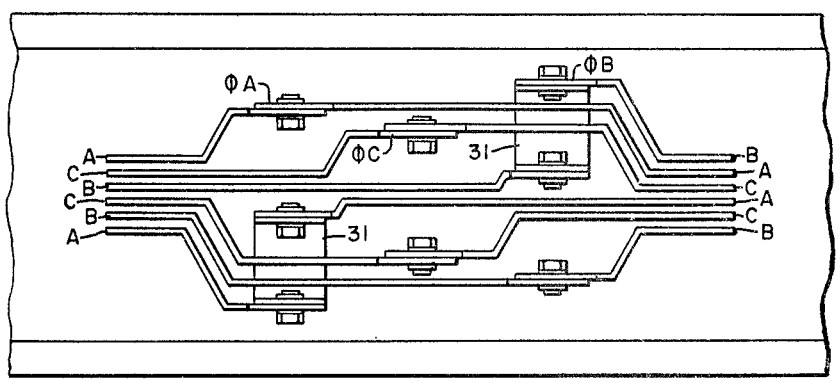
FIG. 5 is a view in section showing a modified form of the connection shown in FIG. 1 without the neutral bus bars.

FIG. 5 shows a modified form of the invention. This figure also shows an interphase transpositioning connection of two sections of bus duct where each section is composed of two sets of multiphase bus bars. The particular embodiment shows two three-phase three-wire sets of bars. It will be understood that the invention is also applicable to three-phase four-wire systems.

It will be seen that the phase relationship of the uppermost set of multiphase bus bars as seen in FIG. 5 is transposed by one U-shaped clamp 31. This clamp transposes the phase B bus bar from a lowermost position within the top set of bus bars to an uppermost position. The phase relationship, therefore, is transposed from $\phi A-\phi C-\phi B$ to $\phi B-\phi A-\phi C$ going from left to right in FIG. 5.

Similarly, another clamp 31, by transposing phase A in the lower set of bus bars, has effected a transposition of phases from $\phi C-\phi B-\phi A$ to $\phi A-\phi C-\phi B$ going from left to right in FIG. 5.

Figure 7:
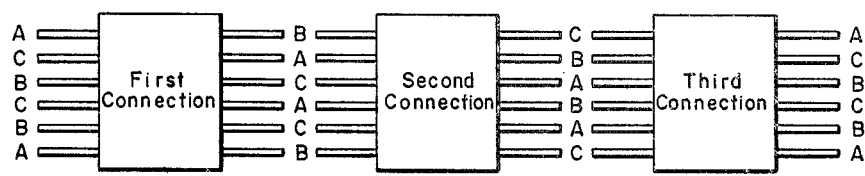
FIG. 7 is a schematic diagram showing three phase transpositioning connections similar to that of FIG. 5 with a return to the original phasing at the third connection.

The phase transpositioning connection of FIG. 5 is shown schematically as a first connection in FIG. 7. Two other similar phase transpositioning connections are schematically shown with a return to the original phasing at the third connection.

A ten-foot section of bus duct partly broken away is shown in two halves in FIGS. 8 and 9. As shown in these figures the insulated bus bars are supported within the housing by eight sets of supports 33. The supports 33 are more specifically described in our U.S. Patent No. 3,178,668 issued April 13, 1965. As is set forth in this other patent, each of the supports 33 comprises two hard wood C-shaped blocks that are drawn towards each other by two bolts firmly supporting the bus bars in place. Two depressions are cut into each block so that the nut and bolt heads do not occupy any additional space outside of the blocks. Spacer elements of suitable insulating material are provided at each support. These spacer elements are generally H-shaped and the blocks firmly grasp the bus bars between the legs of the spacer elements, thereby supporting the bus bars and preventing longitudinal movement of the spacer elements.

Each section of bus duct has four insulated plug-in areas indicated generally at 47. For convenient accessibility, these areas are staggered lengthwise of the section, two being disposed at the top and two being disposed at the bottom of each section. Two metallic hooked-shaped clamps 48 are mounted on the housing on each side of the plug-in areas in order to permit mounting of plug-in units over these plug-in areas.

From the foregoing description, it will be seen that applicants have provided bus duct sections wherein each section is composed of two sets of closely spaced multi-phase bus bars. The bus bars are connected by U-shaped clamps that collect and electrically connect all like phases, thereby balancing the load on each set, and providing an interphase transportation along each set of bus bars. These connections provide a rigid support for the bus bars, and they are conveniently accessible to workmen.

Since numerous changes may be made in the above-described construction and different embodiments of the invention may be made without departing from the spirit and scope thereof, it is intended that all matter contained in the foregoing description, or shown in the accompanying drawings, shall be interpreted as illustrative and not in a limiting sense.

We claim as our invention:

1. In a bus bar system of electric power distribution, two sections of bus duct to be connected together, each of said sections comprising a housing and a set of substantially flat bus bars supported within said housing in a parallel spaced mutually flatwise relation, said sections being supported to approach each other in the same general plane, said bus bars being offset near their connecting ends allowing said sets to overlap, said overlap being such that said sets are disposed at the overlap on opposite sides of an imaginary plane, a separate current conducting clamp attached to the connecting end of each of said bus bars, and additional means connecting each of clamps with another of said clamps to electrically connect said sections.

2. Multiphase electric power distribution apparatus comprising two sections of bus duct, each of said sections comprising a housing and a set of a plurality of substantially flat bus bars each of which conducts a different phase of said multiphase distribution disposed within said housing in a parallel spaced mutually flatwise relation, the relative positions of said different phase conducting bus bars being different in each of said sets, said sets being in an overlapping relationship at the connecting ends thereof, said overlapping relationship being such that said sets are disposed at the overlap on opposite sides of an imaginary plane, a separate current conducting clamp attached to the connecting end of each of said bus bars, the clamps of like phases being connected together thereby electrically connecting said sections, the clamps of unlike phases being spaced longitudinally of said sections.

3. Multiphase electric power distribution apparatus comprising in combination, two sections of bus duct, each of said sections comprising a housing and a set of a plurality of substantially flat bus bars each of which bus bars conducts a different phase of said multiphase distribution disposed within said housing in a parallel spaced mutually flatwise relation, the relative positions of said different phase conducting bus bars being different in each of said sets, said sets being in an overlapping relationship relative to each other at the connecting ends thereof, said overlapping relationship being such that said sets are disposed at the overlap on opposite sides of an imaginary plane, a current conducting generally U-shaped flanged clamp attached to the connecting end of each said bus bars, the connecting ends of said bus bars being relatively positioned longitudinally with the flanges of the clamps of like phases being adjacent each other in a stacked position, means connecting said flanges of adjacent clamps to each other to electrically connect said sections, the clamps of unlike phases being spaced longitudinally of said bus bars.

4. Electric power distribution apparatus comprising two sections of multi-phase bus duct, each of said sections comprising a set of three elongated bus bars supported in a generally parallel relationship, each of said two sets comprising a connecting end, a connecting conjunction connecting said two sets together at said connecting ends and comprising three conducting connecting means, means supporting said two sets with the connecting end of one of said sets being in a generally overlapping relationship with the connnecting end of the other of said sets at said connecting junction, said overlapping relationship being such that said sets are disposed at the overlap on opposite sides of an imaginary plane, each of said three conducting connecting means electrically connecting two bus bars one from each of said sets and supporting the two connected bus bars in a spaced relationship relative to each other at said connecting junction, and said three conducting connecting means comprising phase-transposition connecting means effecting a transposition of the phase orientation of said bus bars at said connecting junction.

5. Electric power distribution apparatus comprising two elongated sections of bus duct, each of said sections comprising a set of elongated bus bars, each of said sets comprising three bus bars, means supporting the three bus bars in each set in a generally parallel relationship such that a generally straight line will pass through all three of the bus bars of the set, a connecting junction connecting said two sets together, means supporting said sets to approach each other along the same general plane, offset means provided at said connecting junction to position said sets in a generally overlapping relationship at said connecting junction, three conducting connecting means connecting said sections together, each of said three conducting connecting means comprising to generally U-shaped clamps and means securing each of the two clamps to a different bus bar of a different one of said sections, each of said generally U-shaped clamps of each of said three conducting connecting means comprising a flange part at the end of each leg thereof, at each of said three conducting connecting means, means connecting the flange parts of the associated two generally U-shaped clamps together to electrically connect the associated two bus bars together and to physically support the associated two bus bars in a spaced relationship relative to each other at the connecting junction.

6. Electric power distribution apparatus comprising two elongated sections of bus duct, each of said sections comprising a set of elongated bus bars, each of said sets comprising four bus bars, means supporting the four bus bars in each set in a generally parallel relationship such that a generally straight line will pass through all four of the bus bars of the set, a connecting junction connecting said two sections together, means supporting said sets to approach each other along the same general plane, offset means provided at said connecting junction to position said sets in a generally overlapping relationship at said connecting junction, four conducting connecting means connecting said sections together, each of said four conducting connecting means comprising two generally U-shaped clamps and means securing each of the two clamps to a different bus bar of a different one of said sections, each of said generally U-shaped clamps of each of said four conducting connecting means comprising a flange part at the end of each leg thereof, at each of said four conducting connecting means, means connecting the flange parts of the associated two generally U-shaped clamps together to electrically connect the associated two bus bars together and to physically support the associated two bus bars in a spaced relationship relative to each other at the connecting junction.

7. Electric power distribution apparatus comprising two elongated sections of multi-phase bus duct, each of said sections comprising two sets of elongated bus bars, each of said sets comprising three bus bars, each of said sections comprising means supporting the six bus bars of the section in a generally parallel relationship such that a generally straight line generally normal to the direction of length of the bus bars will pass first through the three bus bars of one of the two sets in the section and thereafter through the three bus bars of the other of the sets in the section, connecting means connecting said two sections together at a connecting junction, said connecting means comprising three separate conducting connecting means, each of said three separate conducting connecting means electrically connecting four bus bars one from each of said four sets of said two sections and physically spacing the four bus bars relative to each other at the connection, said three separate conducting connecting means comprising phase-transposition connecting means effecting a transposition of the phase-orientation of said bus bars at said connecting junction.

8. Electric power distribution apparatus comprising two elongated sections of multi-phase bus duct, each of said sections comprising two sets of elongated bus bars, each of said sets comprising four bus bars, each of said sections means supporting the eight bus bars of the section in a generally parallel relationship such that a generally straight line generally normal to the direction of length of the bus bars will pass first through the four bus bars of one of the two sets in the section and thereafter through the four bus bars of the other of the two sets in the section, connecting means connecting said two sections together at a connecting junction, said connecting means comprising four separate conducting connecting means, each of said four separate conducting connecting means electrically connecting four bus bars one from each of said four sets of said two sections and physically maintaining the four bus bars in a spaced relationship relative to each other at the connection, said connecting means comprising phase-transposition connecting means effecting a transposition of the phase-orientation of said bus bars at said connecting junction.

9. Electric power distribution apparatus comprising two elongated sections of bus duct, each of said sections comprising two sets of elongated bus bars, each of said sets comprising three bus bars, in each of said sections means supporting the six bus bars of the section in a generally parallel relationship such that a generally straight line will pass first through each of the three bus bars of one of the two sets in the section and then through each of the three bus bars of the other of the two sets in the section, a connecting junction connecting said two sections together in a generally end-to-end relationship and comprising three conducting connecting means, each of said three conducting connecting means electrically connecting four bus bars one from each of said four sets of said two sections, said connected sections comprising an upper group and a lower group, said upper group comprising two of said sets one set from each of said two sections which two sets are disposed generally in an end-to-end relationship, said lower group comprising the other two of said sets one set from each of said two sections which two sets are disposed in a generally end-to-end relationship, said connection being such that when a three-phase power source is applied to said upper group the three phases enter said connecting junction in said upper group in one orientation relative to each other and leave said connecting junction in said upper group in another orientation transposed from said one orientation and when a three-phase power source is applied to said lower group the three phases enter said connecting junction in said lower group in one orientation relative to each other and leave said connecting junction in said lower group in another orientation transposed from said one orientation.

10. Electric power distribution apparatus comprising two elongated sections of bus duct, each of said sections comprising two sets of elongated bus bars, each of said sets comprising four bus bars, in each of said sections means supporting the eight bus bars of the section in a generally parallel relationship such that a generally straight line will pass first through each of the four bus bars of one of the two sets in the section and then through each of the four bus bars of the other of the two sets in the section, a connecting junction connecting said two sections together in a generally end-to-end relationship and comprising four conducting connecting means, each of said four conducting connecting means electrically connecting four bus bars one from each of said four sets of said two sections, each of said four conducting connecting means physically spacing the associated four bus bars in a spaced relationship relative to each other at said connecting junction, said connected sections comprising an upper group and a lower group, said upper group comprising two of said sets one set from each of said two sections which two sets are disposed generally in an end-to-end relationship, said lower group comprising the other two of said sets one set from each of said two sections which two sets are disposed in a generally end-to-end relationship, said connection being such that when a three-phase-neutral power supply is applied to said upper group the three phases and neutral enter said connecting junction in said upper group in one orientation relative to each other and leave said connecting junction in said upper group in another orientation transposed from said one orientation and when a three-phase-neutral power supply is applied to said lower group the three phases and neutral enter said connecting junction in said lower group in one orientation relative to each other and leave said connecting junction in said lower group in another orientation transposed from said one orientation.

11. Electric power distribution apparatus comprising two sections of bus duct, each of said two sections comprising two adjacent sets of bus bars, each of said four sets of bus bars comprising three bus bars, means connecting said two sections together, said connecting means comprising a separate conducting clamp for each of said twelve bus bars and means connecting each of said conducing clamps to the associated bus bar, said connecting means comprising three sets of said conducting clamps each of which sets of clamps comprises four conducting clamps one from each of said four sets of bus bars, separate connecting means at each of said sets of clamps detachably connecting the four clamps together to electrically connect four bus bars from said four sets together.

12. Electric power distribution apparatus comprising two sections of bus duct, each of said two sections comprising two sets of bus bars, each of said four sets of bus bars comprising three bus bars, means connecting said two sections together, said connecting means comprising a separate conducting clamp for each of said twelve bus bars and means connecting each of said conducting clamps to the associated bus bar, said connecting means comprising three sets of clamps, each of said sets of clamps comprising four clamps one from each of said four sets of bus bars, separate connecting means at each of said three sets of clamps detachably connecting the four clamps of the set together in a nested relationship to electrically connect four bus bars from said four sets together, and each of said sets of four clamps supporting the four bus bars that are connected by the four clamps in a spaced relationship relative to each other at the connection.

13. Electric power distribution apparatus comprising two elongated sections of bus duct, each of said sections comprising two sets of elongated bus bars, each of said sets comprising three bus bars, in each of said sections means supporting the six bus bars of the section in a generally parallel relationship such that a generally straight line will pass first through each of the three bus bars of one of said sets in the section and then through each of the three bus bars of the other of the sets in the section, a connecting junction connecting said two sections together, said sections being in an overlapping relationship at said connecting junction and comprising an upper section and a lower section at said connecting junction, three conducting connecting means connecting said sections together, each of said conducting connecting means comprising four generally U-shaped clamps and means securing each of the four clamps to a different bus bar of a different one of said four sets, each of said generally U-shaped clamps of each of said conducting connecting means comprising a flange part at the end of each leg thereof, at each of said conducting connecting means the two generally U-shaped clamps of the upper section being in a generally nested relationship and the two generally U-shaped clamps of the lower set being in a generally nested relationship, at each of said conducting connecting means the leg parts of the two generally U-shaped clamps of the upper section extending generally toward the leg parts of the two generally U-shaped clamps of the lower section, at each of said conducting connecting means, means securing the flange parts of the four generally U-shaped clamps together to electrically connect the four bus bars together and to physically support the four bus bars in a spaced relationship relative to each other at the connecting junction, said connected sections comprising an upper group and a lower group, said upper group comprising two of said sets one set from each of said two sections which two sets enter said connecting junction in a generally end-to-end relationship, said lower group comprising the other two of said sets one set from each of said two sections which two sets enter said connecting junction in a generally end-to-end relationship, said connection being such that when a three-phase power supply is applied to said upper group the three phases enter said connecting junction in said upper group in one orientation relative to each other and leave said connecting junction in said upper group in another orientation transposed from said one orientation and when a three-phase power supply is applied to said lower group the three phases enter said connecting junction in said lower group in one orientation relative to each other and leave said connecting junction in said lower group in another orientation transposed from said one orientation.

14. Electric power distribution apparatus comprising two elongated sections of bus duct, each of said sections comprising two sets of elongated bus bars, each of said sets comprising four bus bars, in each of said sections means supporting the four bus bars of the section in a generally parallel relationship such that a generally straight line generally normal to the direction of length of the bus bars will pass first through each of the four bus bars of one of said sets in the section and then through each of the four bus bars of the other of the sets in the section, a connecting junction connecting said two sections together, means supporting said sections to approach each other along the same general plane, each of said sections being offset at the connecting end thereof whereby an upper of said sections generally overlaps a lower of said section at said connecting junction, four conducting connecting means connecting said sections together, each of said conducting connecting means comprising four generally U-shaped clamps and means securing each of the four clamps to a different bus bar of a different one of said four sets, each of said generally U-shaped clamps of each of said conducting connecting means comprising a flange part at the end of each leg thereof, at each of said conducting connecting means the two generally U-shaped clamps of the upper section being in a generally nested relationship and the two generally U-shaped clamps of the lower set being in a generally nested relationship, at each of said conducting connecting means the leg parts of the two generally U-shaped clamps of the upper section extending generally toward the leg parts of the two generally U-shaped clamps of the lower section, at each of said conducting connecting means, means securing the flange parts to the four generally U-shaped clamps together to electrically connect the four bus bars together and to physically support the four bus bars in a spaced relationship relative to each other at the connecting junction, said connected sections comprising an upper group and a lower group, said upper group comprising two of said sets one set from each of said two sections which two sets enter said connecting junction in a generally end-to-end relationship, said lower group comprising the other two of said sets one set from each of said two sections which two sets enter said connecting junction in a generally end-to-end relationship, said connection being such that when a three-phase-neutral power supply is applied to said upper group the three phases and neutral enter said connecting junction in said upper group in one orientation relative to each other and leave said connecting junction in said upper group in another orientation transposed from said one orientation and when a three-phase-neutral power supply is applied to said lower group the three phases and neutral enter said connecting junction in said lower group in one orientation relative to each other and leave said connecting junction in said lower group in another orientation transposed from said one orientation.

References Cited by the Examiner

UNITED STATES PATENTS

| | | | |
|---|---|---|---|
| 2,216,870 | 10/40 | Adams | 174—34 X |
| 2,653,991 | 9/53 | Dyer et al. | 174—99 |
| 2,786,152 | 3/57 | Fisher | 174—33 X |
| 2,884,548 | 4/59 | Scott et al. | 307—147 |
| 2,992,291 | 7/61 | Kussy | 174—88 |
| 3,148,312 | 9/64 | Fouse | 339—22 X |

JOHN F. BURNS, *Primary Examiner.*

JOHN P. WILDMAN, DARRELL L. CLAY, *Examiners.*